(12) United States Patent
Navarro-Sorroche et al.

(10) Patent No.: US 9,835,760 B2
(45) Date of Patent: Dec. 5, 2017

(54) TRITIUM-TRITIUM NEUTRON GENERATOR AND LOGGING METHOD

(71) Applicant: Halliburton Energy Services, Inc., Houston, TX (US)

(72) Inventors: Juan Navarro-Sorroche, Plano, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/023,151

(22) PCT Filed: Dec. 31, 2013

(86) PCT No.: PCT/US2013/078482
§ 371 (c)(1),
(2) Date: Mar. 18, 2016

(87) PCT Pub. No.: WO2015/102615
PCT Pub. Date: Jul. 9, 2015

(65) Prior Publication Data
US 2016/0231457 A1 Aug. 11, 2016

(51) Int. Cl.
*G01V 5/10* (2006.01)
*E21B 47/01* (2012.01)
(Continued)

(52) U.S. Cl.
CPC ............ *G01V 5/107* (2013.01); *E21B 47/011* (2013.01); *E21B 49/00* (2013.01); *G21G 4/02* (2013.01)

(58) Field of Classification Search
CPC .......... G01V 5/10; G01V 5/102; G01V 5/105; G01V 5/145; G01V 5/108
See application file for complete search history.

(56) References Cited

U.S. PATENT DOCUMENTS 2,211,668 A 8/1940 Penning
3,546,512 A 12/1970 Frentrop
(Continued)

FOREIGN PATENT DOCUMENTS

WO WO-2008070103 A2 6/2008
WO WO-2012105937 A1 8/2012
(Continued)

OTHER PUBLICATIONS

Persaud et al., "A compact neutron generator using a field ionization source," Sep. 2011, Proceedings of the 14th International Conference on Ion Sources, Giardini Naxos, Italy.*
(Continued)

*Primary Examiner* — Kiho Kim
(74) *Attorney, Agent, or Firm* — Gilliam IP PLLC

(57) ABSTRACT

A well logging tool includes a neutron generator to generate and emit energetic neutrons using substantially exclusively a T-T fusion reaction. The well logging tool can include measuring instrumentation for measurement and logging of formation parameters based on elastic scattering in subsurface formations of neutrons emitted by the neutron generator. The neutron generator can have a concentric layout, in which a cylindrical target structure loaded with tritium particles is located co-axially in an elongate cylindrical housing, with mobile tritium ions being accelerated radially inwardly into impact with the target structure. Production of the mobile tritium ions may be by field ionization through operation of a nano-structure field ionization array.

19 Claims, 6 Drawing Sheets

(51) Int. Cl.
   *E21B 49/00*   (2006.01)
   *G21G 4/02*   (2006.01)

(56) References Cited

U.S. PATENT DOCUMENTS

| | | | |
|---|---|---|---|
| 4,570,067 A | | 2/1986 | Gadeken |
| 4,675,145 A | | 6/1987 | Kuswa et al. |
| 4,794,792 A | | 1/1989 | Flaum et al. |
| 4,924,485 A | | 5/1990 | Hoeberling |
| 4,996,017 A | | 2/1991 | Ethridge |
| 5,104,610 A | | 4/1992 | Bernardet et al. |
| 5,293,410 A | | 3/1994 | Chen et al. |
| 2001/0007783 A1 | | 7/2001 | Lee et al. |
| 2002/0096363 A1 | * | 7/2002 | Evans ............... E21B 49/00 175/41 |
| 2004/0022341 A1 | | 2/2004 | Leung et al. |
| 2009/0045329 A1 | | 2/2009 | Stoller |
| 2009/0065712 A1 | * | 3/2009 | Zillmer ............... H05H 6/00 250/496.1 |
| 2009/0108192 A1 | | 4/2009 | Groves |
| 2009/0114838 A1 | | 5/2009 | Lozano et al. |
| 2009/0135982 A1 | | 5/2009 | Groves |
| 2010/0061500 A1 | * | 3/2010 | Lou ............... G21G 4/02 376/114 |
| 2010/0301196 A1 | * | 12/2010 | Chu ............... H01J 27/26 250/251 |
| 2011/0049345 A1 | | 3/2011 | Roberts |
| 2011/0114830 A1 | | 5/2011 | Reijonen et al. |
| 2011/0169492 A1 | | 7/2011 | Groves |
| 2012/0213319 A1 | | 8/2012 | Kwan et al. |
| 2013/0044846 A1 | | 2/2013 | Schenkel et al. |
| 2013/0105680 A1 | | 5/2013 | Guo et al. |
| 2013/0168542 A1 | | 7/2013 | Navarro-sorroche |

FOREIGN PATENT DOCUMENTS

| | | |
|---|---|---|
| WO | WO-2013016145 A1 | 1/2013 |
| WO | WO-2015102607 A1 | 7/2015 |
| WO | WO-2015102615 A1 | 7/2015 |
| WO | WO-2015102617 A1 | 7/2015 |

OTHER PUBLICATIONS

Johnson et al., "Field ion source development for neutron generators," 2012, Nuclear Instruments and Methods in Physics Research A, vol. 663, pp. 64-74.*

"European Application Serial No. 13900746.2, Extended European Search Report dated Nov. 20, 2015", 11 pgs.
"International Application Serial No. PCT/US2013/078456, International Search Report dated Sep. 25, 2014", 3 pgs.
"International Application Serial No. PCT/US2013/078456, Written Opinion dated Sep. 25, 2014", 5 pgs.
"International Application Serial No. PCT/US2013/078482, International Search Report dated Sep. 29, 2014", 3 pgs.
"International Application Serial No. PCT/US2013/078482, Written Opinion dated Sep. 29, 2014", 10 pgs.
"International Application Serial No. PCT/US2013/078485, International Search Report dated Sep. 22, 2014", 3 pgs.
"International Application Serial No. PCT/US2013/078485, Written Opinion dated Sep. 22, 2014", 8 pgs.
Chen, A X, et al., "Electronic neutron sources for compensated porosity well logging", Nuclear Instruments & Methods In Physics Research. Section A: Accelerators, Spectrometers, Detectors, and Associated Equipment, vol. 684, (Apr. 25, 2012), 52-56.
Persaud, Arun, et al., "Development of a Compact Neutron Source based on Field Ionization Processes", Arxiv.Org, Cornell University Library, 201 Olin Library Cornell University Ithaca, NY 14853, (Oct. 12, 2010).
Sy, A, et al., "Novel methods for improvement of a Penning ion source for neutron generator applications", Review of Scientific Instruments, 83(2), 02B309, (2012), 3 pgs.
U.S. Appl. No. 14/914,560, filed Feb. 25, 2016, Field Emission Ion Source Neutron Generator.
U.S. Appl. No. 14/777,629, filed Sep. 16, 2015, Nano-Emitter Ion Source Neutron Generator.
"European Application Serial No. 13900746.2, Office Action dated Jul. 22, 2016", 4 pgs.
"European Application Serial No. 13900746.2, Office Action dated Dec. 8, 2015", 1 pg.
"European Application Serial No. 13900838.7, Office Action dated Aug. 9, 2016", 2 pgs.
"International Application Serial No. PCT/US2013/078456, International Preliminary Report on Patentability dated Jul. 14, 2016", 7 pgs.
"International Application Serial No. PCT/US2013/078482, International Preliminary Report on Patentability dated Jul. 14, 2016", 12 pgs.
"International Application Serial No. PCT/US2013/078485, International Preliminary Report on Patentability dated Apr. 11, 2016", 9 pgs.
"International Application Serial No. PCT/US2013/078485, Response filed Oct. 29, 2015 to Written Opinion dated Sep. 22, 2014", 4 pgs.

* cited by examiner

TRITIUM-TRITIUM NEUTRON GENERATOR AND LOGGING METHOD

TECHNICAL FIELD

This disclosure generally relates to the evaluation of subsurface formations using neutron generators, and more specifically to well tool logging systems and methods.

BACKGROUND

Pulsed-neutron formation evaluation tools interrogate the formation surrounding the borehole with high-energy neutrons produced by a neutron generator forming part of the tool. Because of interaction by the neutrons with elements of the tool, with the borehole, and with the formation, gamma radiation is created, which is then measured by gamma radiation sensors that also form part of the tool. Measurement data captured by the gamma radiation sensors can be processed to derive information about the properties of the borehole and the subsurface formations.

The energetic neutrons are commonly produced by a deuterium-tritium (D/T) fusion reaction caused, for example, by generating an ion beam and accelerating it into collision with a target loaded with target molecules or atoms.

Some formation properties are evaluated by means of gamma radiation at lower energies than that produced by such pulsed neutron generator tubes. Porosity logging tools, for example, typically make use of AmBe chemical neutron sources.

BRIEF DESCRIPTION OF THE DRAWINGS

Some embodiments are illustrated by way of example and not limitation in the figures of the accompanying drawings.

DETAILED DESCRIPTION

In the following description, for purposes of explanation, numerous specific details are set forth to provide a thorough understanding of example embodiments. It will be evident to one skilled in the art, however, that the present subject matter may be practiced without these specific details.

Some embodiments of the disclosure provide for subsurface formation evaluation based on downhole neutron generation and emissions using a tritium-tritium (T-T) fusion reaction. A well logging tool may include a neutron generator configured to generate and emit energetic neutrons using substantially exclusively the T-T fusion reaction.

The well logging tool may include measuring instrumentation configured for measurement and logging of formation parameters based on elastic scattering in subsurface formations of neutrons emitted by the neutron generator. As will be described in more depth below, conventional accelerator-based neutron generators, such as neutron generators using the deuterium-tritium (D-T) reaction, produce highly energetic neutrons that are unsuitable for measurements based on elastic scattering, instead being used for measuring formation characteristics indicated by inelastic scattering behavior.

The neutron generator may have a concentric layout, in which a cylindrical target structure is located co-axially in an elongate cylindrical housing, with mobile tritium ions being accelerated radially inwardly into impact with the target structure. The cylindrical target structure may be loaded with substantially exclusively tritium target particles, such as tritium atoms, tritium molecules, or tritium ions. Impact of the accelerated tritium ions with the target particles results in T-T fusion, thereby generating and emitting neutrons from the target structure.

Figure 1:
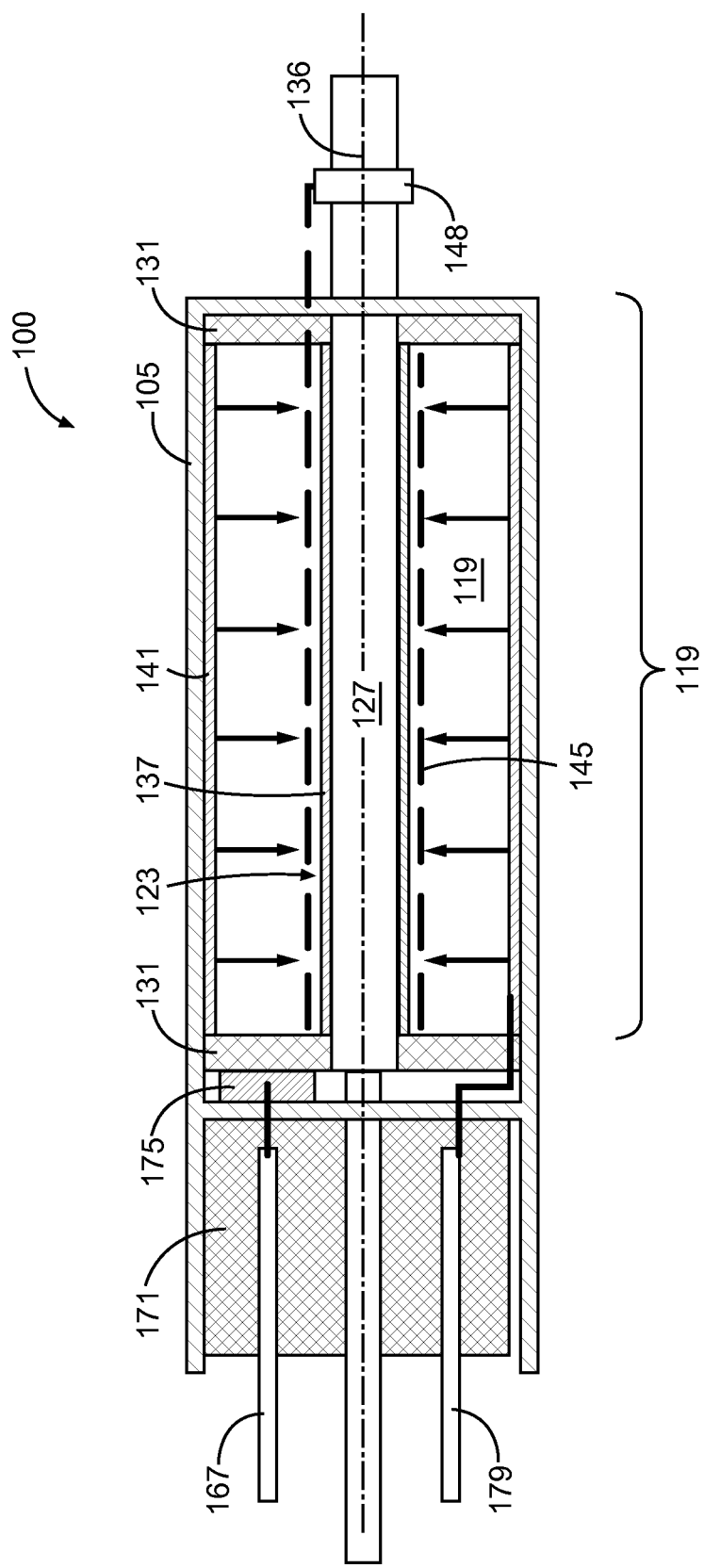
FIG. 1 is a schematic sectional side view of a neutron generator for a well logging tool, according to one example embodiment.

FIG. 1 shows a schematic diagram of a neutron generator 100 in accordance with an example embodiment. The neutron generator 100 is configured for incorporation in a logging tool 605 such as that described with reference to FIG. 6. The neutron generator comprises a cylindrical housing 105 having a central longitudinal axis 136 which is in use to be oriented co-axially with the well tool 605 and with a borehole 616 (FIG. 6) in which the well tool 605 is located. The housing 105 is closed off at opposite ends by transverse insulator bulkheads 131, so that an interior of the housing defines a ion chamber 119. The ion chamber 119 is hermetically sealed and is in use maintained at very low pressure conditions, or vacuum conditions. Being dimensioned for incorporation in the logging tool 605 the neutron generator 100 has a diameter of 1.69 inches or less, in this example having a 1.5 inch diameter.

The neutron generator 100 has a nanotip field ionization (FI) array 141 for ionizing tritium gas in the ion chamber, to produce tritium ions for neutron generation. In this example embodiment, the field ionization array 141 is cylindrical and is co-axial with the housing 105. The field ionization array 141 is in this example attached to a radially inner cylindrical surface of the housing 105. In other embodiments, a cylindrical support surface for the field ionization array 141 may be provided by a separate component. As will be described at greater length with reference to FIG. 2 below, the nanotip array 141 may comprise carbon nano fibers. In other embodiments, the nanotip array 141 may comprise tungsten nanotips.

The neutron generator 100 further has a target structure 123 comprising a cylindrical target rod 127 located co-axially in the ion chamber 119, and one or more target layers 137 deposited on a radially outer cylindrical surface of the target rod 127. An annular cavity is thus defined in the ion chamber 119 between the cylindrical target structure provided by the target layers 137 on the target rod 127 and the cylindrical nanotip array 141. In this example, the target rod 127 is of copper, and the target layers 137 comprise multiple layers of titanium, erbium, and other transition materials known in the art, to form a multilayer structure providing a target lattice to absorb and retain target particles for use in a fusion reaction. In this example, predominantly monatomic tritium atoms are deposited in the target layers 137 in a process known as target loading.

A FI array control electrode 179 is mounted in a header section 171 of the neutron generator 100, and is coupled to the FI array 141 for, during operation, applying voltage pulses to the nanotip array 141, as will be described at greater length with reference to FIG. 2. Further, the neutron generator 100 includes an accelerator arrangement to accelerate positively charged ions radially inwards into the target layers 137 on the target rod 127. The accelerator arrangement includes an electrical circuit (not shown) connected to provide a voltage difference between the FI array 141 and the target rod 127. The insulator bulkheads 131 serve not only to space the FI array 141 radially from the target structure 123, but also provides electrical insulation, isolating high voltages between the nanotip array 141 and the target rod 127. A target suppressor grid 145 is placed concentrically around the target rod 127, being located in the annular cavity of the ion chamber 119, radially adjacent the target rod 127. The target suppressor grid 145 is connected to a suppressor grid electrode 148 and serves to suppress secondary electrons emitted during bombardment of the target structure 123 with energetic tritium (T+) ions.

The neutron generator 100 includes an ion source for producing positively charged tritium (T+) ions in the ion chamber. The ion source in this example embodiment comprises the nanotip FI array 141 and a gas source to provide ionizable gasphase tritium molecules in the ion chamber for field ionization by the nanotip array 141. In this embodiment, the gas source comprises a gas reservoir element 175 (FIG. 1) to allow selective control of tritium gas release into the ion chamber 119, and to control gas pressure in the ion chamber 119. The construction and operation of the gas reservoir element 175 may be in accordance with known methods for controlling ionizable gas release and pressure in neutron generator tubes. In this example embodiment, the gas reservoir element 175 comprises a tungsten filament coated with a film of zirconium or the like. Adsorption and desorption of tritium atoms/molecules can be controlled by controlling the temperature of the gas reservoir element 175, and thereby controlling ionization gas conditions in the ion chamber 119. A control arrangement of the neutron generator 100 accordingly includes a gas reservoir control electrode 167 for controlling tritium gas conditions in the ion chamber 119 by controlling energization of the gas reservoir element 175.

The ionization mechanism employed in this example embodiment is known as field ionization (FI) or electrostatic field desorption (EFD), in which the presence of an electric field causes electrons to become detached from their respective protons, resulting in ionization of the atoms/molecules, which are then immediately driven away by action of the electric field. Detachment of the electrons from their protons are understood to be by tunneling into a bulk material. Field ionization is thus essentially an autoionization-type process, wherein an internally supra-excited atom or molecular moiety loses an electron spontaneously without further interaction with an energy source. Field ionization can be achieved by use of an array of nano structures located at a barrier between a conductor or semiconductor substrate and a low-pressure volume. In this example embodiment, the nanotip array 141 are provided on a cylindrical support surface provided by a substrate 213 (FIG. 2) of a nickel-based material.

Figure 2:
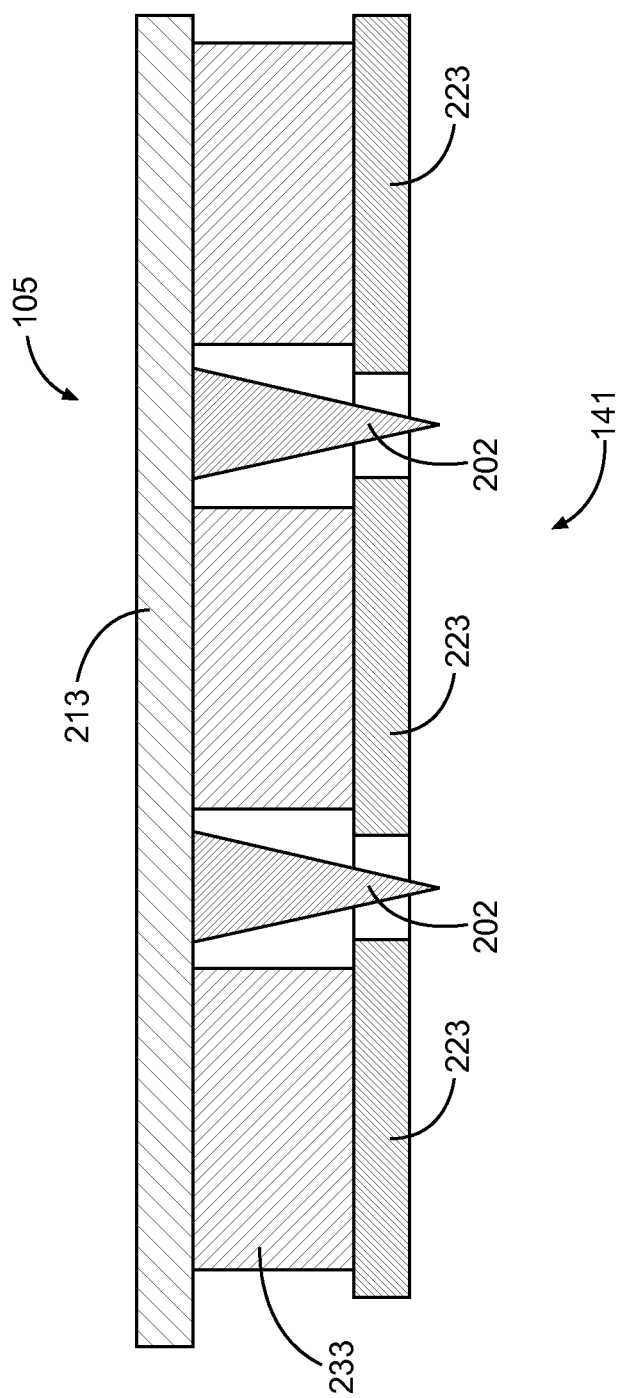
FIG. 2 is a simplified sectional side view, on an enlarged scale, of a part of a nanotip field ionization array for the neutron generator of FIG. 1, according to one example embodiment.

FIG. 2 shows a simplified axial section of a part of the nano-emitter field ionization array 141 of the example neutron generator 100. The field ionization array 141 comprises a multitude of nanotips 202 on the cylindrical substrate 213, in this example embodiment comprising tungsten formations attached to the substrate 213. In other example embodiments, nano structures providing the field ionization array 141 may have different shapes and/or may be of different materials. In one embodiment, the field ionization array may comprise carbon nano fibers. In another embodiment, each nanotip may comprise, for example, a tungsten base tip attached to the substrate 213 and a carbon nanotip molecularly formed on the end of the tungsten base tip. Each nanotip 202 projects cantilever-fashion away from the substrate 213, being substantially perpendicular to the inner cylindrical surface of the substrate 213. Each nanotip 202 thus extends substantially radially inwards towards the central axis 136 of the ion chamber 119 (FIG. 1), being directed radially inwards to the target structure 123. Each nanotip 202 is roughly conical in shape, tapering to a tip end furthest from the substrate 213. The length of each nanotip is less than 10 nm, in this example embodiment being about 2 nm. In this example, the density of the nanotips 202 on the base disc 147 is between $10^4$ and $10^6$ nanotips per square centimeter.

As can be seen in FIG. 2, the FI array 141 in this embodiment may include gate electrodes 223 interspersed between the nanotips 202 and spaced from the substrate 213 by insulators 233. The spacing between the nanotips 202 and the gate electrodes 223 is selected such that pulses of ionization voltage between gate electrodes 223 and the nanotips 202 act to generate ions from the tritium gas in the ion chamber 119 due to the operation of field ionization, as described above.

During operation, a high voltage (in this example, approximately 100 kV) is applied between the target structure 123 and the FI array 141. The FI nanotip array 141 is then pulsed with negative voltage pulses at a predetermined repetition rate. In this example, the voltage pulse applied to the FI array 141 is approximately 1 kV, with a turn-on/turn-off time no greater than 1 µs. Voltage pulses thus applied to the FI array 141 cause production of predominantly monatomic tritium ions at the radially outer periphery of the ion chamber 119, by operation of field ionization. The predominantly monatomic T+ ions are then accelerated radially away from the FI nanotip array 141 and into impact with the tritium-impregnated target layers 137, resulting in the creation of neutrons by the tritium-tritium fusion reaction. Particular aspects of the tritium-tritium fusion reaction employed here for formation evaluation, as compared to conventional deuterium-tritium fusion reactions, will be described below with reference to FIGS. 3-5.

Figure 6:
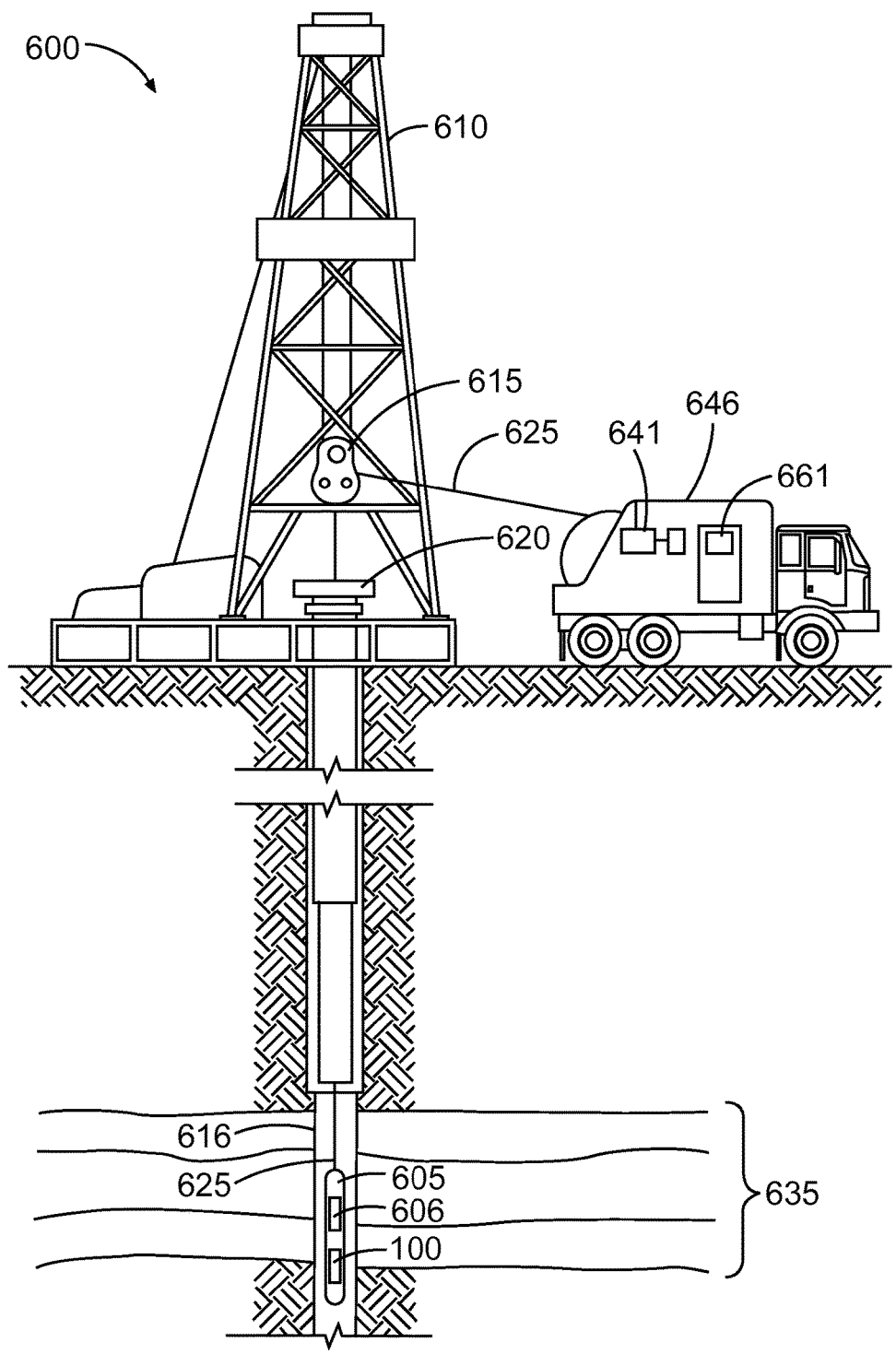
FIG. 6 shows a diagrammatic view of a wireline logging system that includes a neutron generator, according to an example embodiment.

The neutrons escape in random, symmetrical directions from the target layers 137 towards the surrounding environment, which may be a subsurface formation (see for example FIG. 6). When the neutron generator 100 forms part of a subterranean logging tool 605, the neutrons are thus ejected into a surrounding formation to enable evaluation of physical characteristics of the subsurface formation.

As will be evident from the above description, the disclosure provides a pulsed neutron generator 100 based on the tritium-tritium (T-T) fusion reaction. Benefits of the described neutron generator 100 and methods of well logging based neutron emission generated by the T-T fusion reaction will best be understood in view of the discussion that follows.

Neutron generators for oil/gas well logging are usually based on the Deuterium-Tritium (D-T) nuclear fusion reaction for producing highly energetic (14.1 MeV) neutrons. One reason for use of the D-T reaction is that the fusion of Deuterium and Tritium has the lowest threshold energy and the highest cross section of the three (D-D, D-T, T-T)

possible nuclear fusion reactions of Hydrogen isotopes. The D-T fusion reaction forms a compound He5 nucleus, and, as shown in the diagram of FIG. 3A, has a reaction energy (Q) value $$Q = (m_D + m_T - m_{He5})931.494 \approx 16.7957 \text{ MeV} \quad (1)$$

which is approximately 44.3 keV lower than the energy corresponding to the second level of the He5 nucleus (FIG. 3A).

Angular momentum conservation for the D/T-He5 system gives

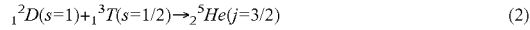

$$_1^2D(s=1) + _1^3T(s=1/2) \rightarrow _2^5He(j=3/2) \quad (2)$$

Figure 3:
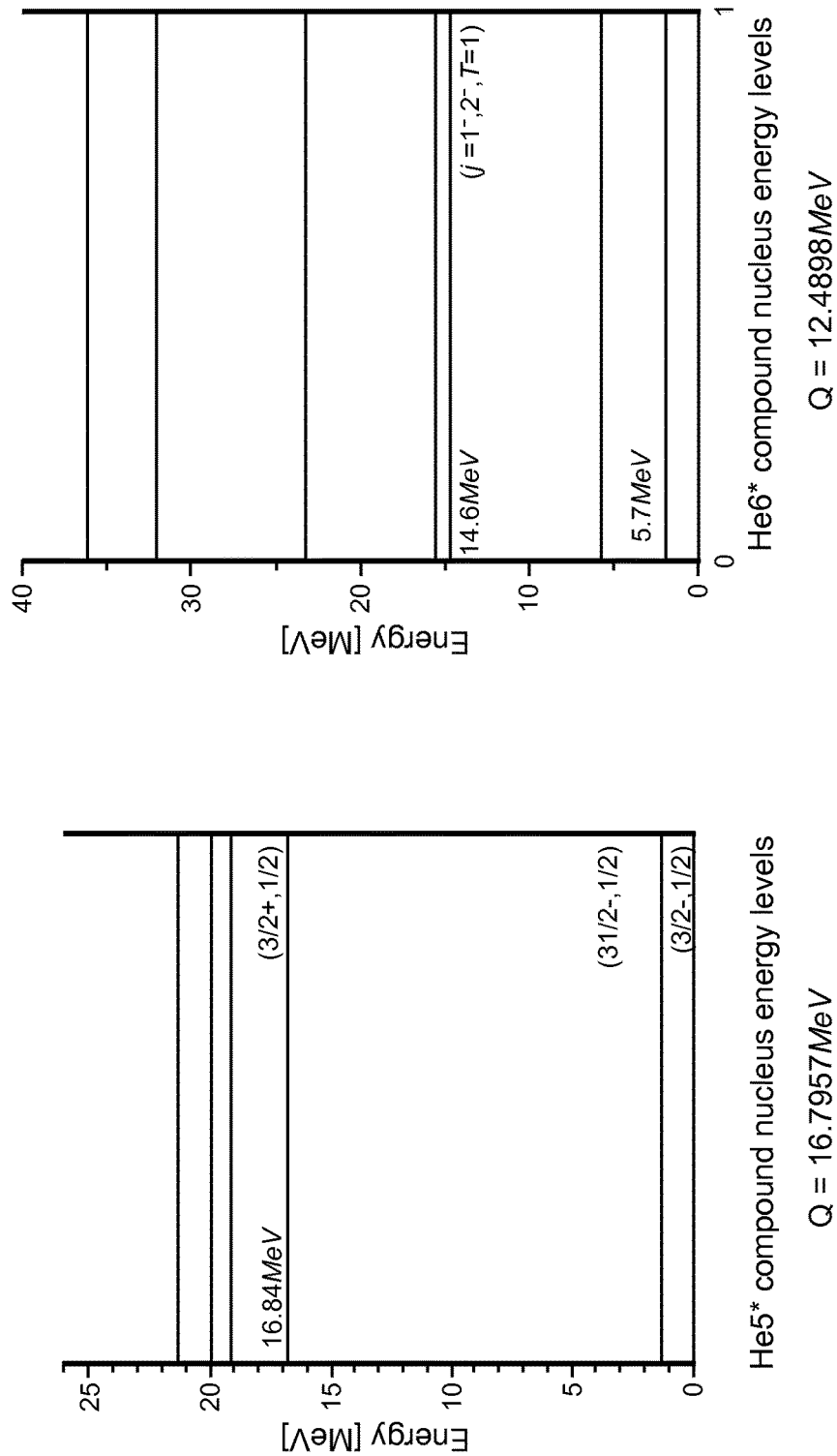
FIGS. 3A and 3B are diagrams showing respective compound nucleus energy levels for a conventional deuterium-tritium (D-T) fusion reaction, and for a tritium-tritium (T-T) fusion reaction employed, for example, by the neutron generator of FIG. 1.

The angular momentum of the D/T nuclei is the same as the angular momentum of the compound He5, and the energy of the D/T reaction is approximately 44.3 keV lower than the He5 compound nucleus second energy level. Thus, by giving the incident D ion a kinetic energy higher than 44.3 keV, resonance tunneling to the second energy level of the He5 compound nucleus can be achieved. With reference to FIG. 3, it will be understood that this resonance tunneling is responsible for the about two order of magnitude higher cross section for the D/T reaction relative to the other two (D-D, T-T) fusion reactions at the D/T resonance peak (~107 keV).

A similar calculation for the T-T fusion reaction (see Equation 5 below) gives $$Q = (2m_T - m_{He6})931.494 \approx 12.4998 \text{ MeV} \quad (3)$$

and

Figure 4:
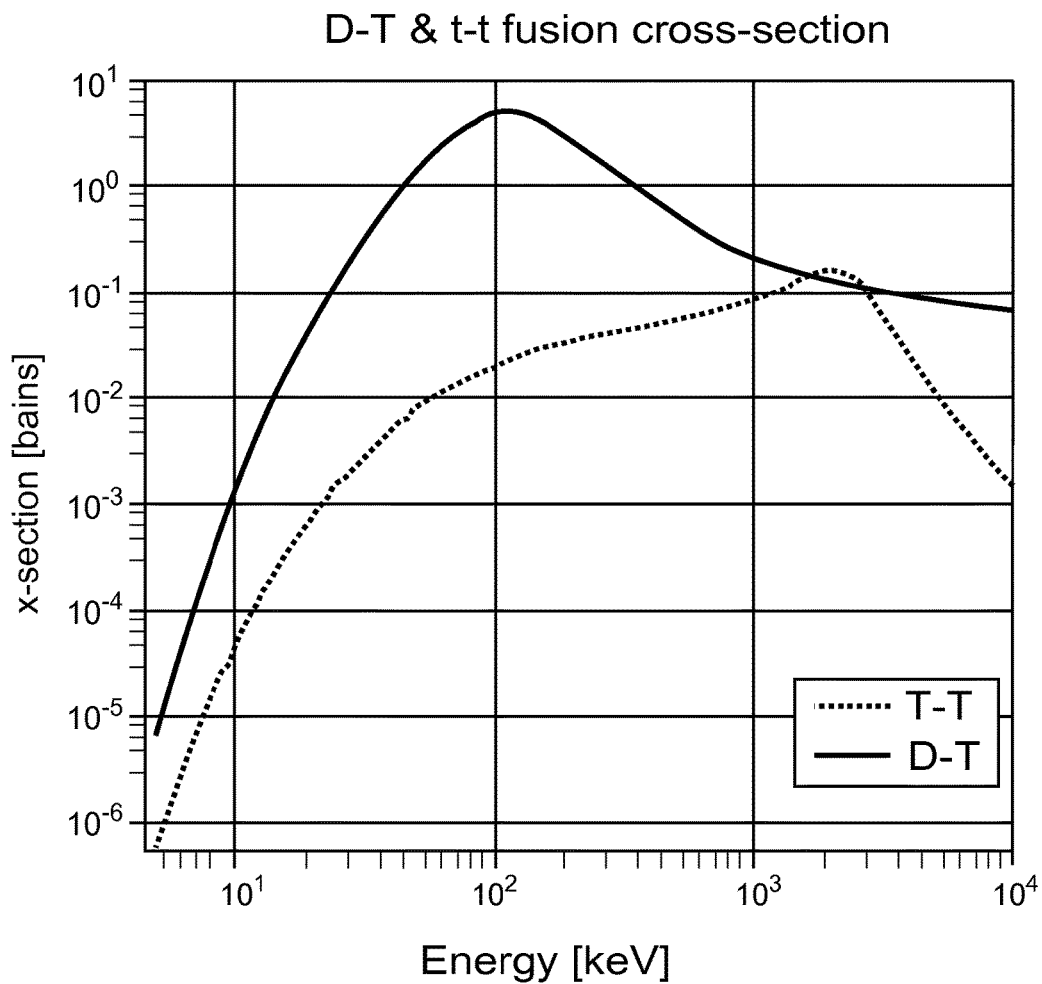
FIG. 4 shows a graph of a plot of the D-T fusion reaction compared with the conventional T-T fusion reaction.

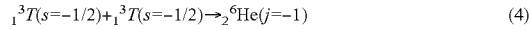

$$_1^3T(s=-1/2) + _1^3T(s=-1/2) \rightarrow _2^6He(j=-1) \quad (4)$$

respectively. From equations 3, 4 and FIG. 3B (showing the energy levels of the He6 nucleus), it can be concluded that the closest energy level of the compound He6 nucleus having angular momentum and isospin j=−1, T=1 is the energy level corresponding to 14.6 MeV. Thus, an additional energy of approx. 2.1 MeV has to be imparted to the incident Tritium nucleus for a reaction to take place. This analysis explains an about two orders of magnitude lower cross section observed for the T-T fusion reaction compared with the conventional D-T reaction. FIG. 4 shows a graph of a plot of the T-T fusion reaction together with the D-T reaction.

Neutron generators based on the D-T fusion reaction are thus the commonly used source of high energy (14.1 MeV) neutrons because of their high neutron yield and the lower threshold energy (UHV) required for their operation. The high energy monochromatic type of neutrons produced by a D-T neutron generator undergoes inelastic scattering with the surrounding formation, which is appropriate for evaluation of formation properties conventionally investigated using the transmission from accelerator-based neutron generators.

Figure 5:
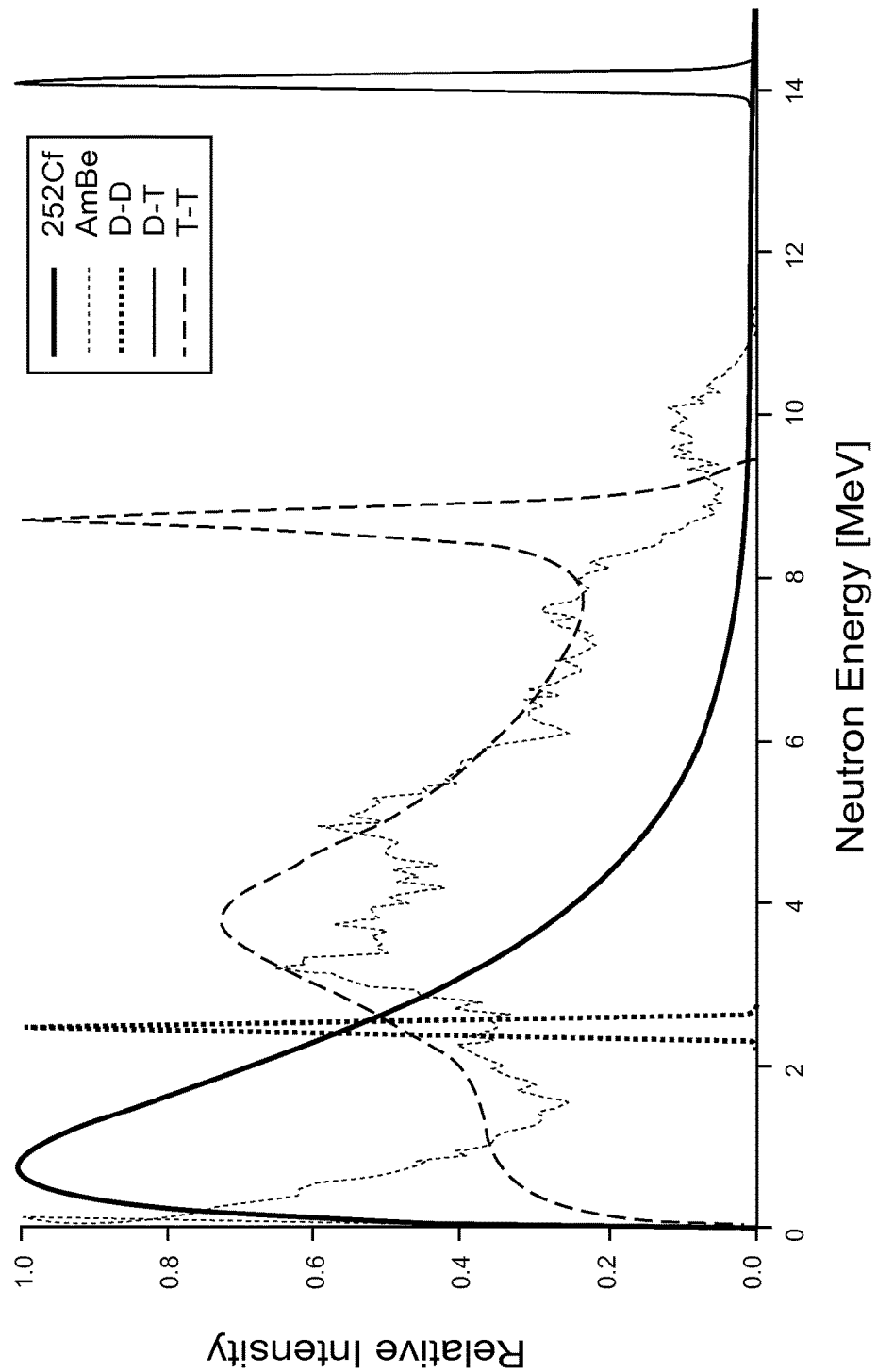
FIG. 5 shows a graph of energy spectrums for neutrons from a number of different energy sources.

Investigation of some formation properties, such as formation porosity and the hydrogen index, depends on the lower energy elastic scattering of neutrons with formation elements. Such lower energy neutrons are conventionally provided by chemical neutron sources. FIG. 5 shows the respective energy spectrums of neutrons produced by typical chemical neutron sources, as well as showing the energy spectrums for neutrons from the D-D, D-T and TT fusion reactions. Because in the T-T fusion reaction $$_1^3T + _1^3T \rightarrow _2^4He + 2_0^1n + 11.3 \text{ MeV} \quad (5)$$

two neutrons are produced, the energy of the reaction is shared by the alpha particle and the two neutrons. Accordingly, the neutrons' energy can in principle vary from zero to approximately 11 MeV.

This disclosure comprises provision of a T-T neutron generator (such as that described above with reference to FIGS. 1-2) and use of neutrons emitted by the T-T fusion reaction in well logging for measuring or investigating formation properties based on elastic scattering of the neutrons with formation elements. The T-T neutron generator 100 is thus in one embodiment used for porosity logging, or to determine the hydrogen index of formations. For the reasons mentioned above, lower energy neutron sources are more sensitive to formation porosity. The average neutron energy from the T-T fusion reaction is about 4 MeV, which is suitable for causing elastic scattering for formation porosity measurement. The TT fusion reaction also provides neutron emission over a broad range of neutron energies.

Porosity logging services are often provided using neutron-neutron tools with AmBe sources Similar to the T-T neutron generator 100, the average neutron energy from AmBe sources is about 4 MeV. The inventors have recognized moreover that the spectrum of the neutrons produced by the TT fusion reaction corresponds significantly to the spectrum of neutrons produced by the AmBe chemical neutron source, as shown in FIG. 5. The T-T neutron generator 100 is thus presented as an accelerator-based replacement for AmBe241 sources in logging applications. Use of the accelerator-based T-T neutron generator 100 to evaluate formation characteristics which are currently measured with radioactive chemical sources are beneficial in that many safety consideration and operational complications associated with radioactive chemical neutron sources can be avoided.

Furthermore, the similarity of average source energy for the T-T neutron generator 100 and AmBe241 and be expected to result in similar environmental effects due to neutron emission from the respective sources. This is expected to facilitate replacement of the currently used radioactive sources, due at least to shorter learning curves for petrophysicists in oil companies than would otherwise be the case A difficulty in practical use of T-T fusion as neutron source for logging applications, however, is the production of nuclear mission with sufficient yield for logging purposes in the confined spaces available in logging applications. As shown in FIG. 4, at the Ultra High Voltage (UHV) (~120 kV) practically realizable in typical oil/well logging applications, the Tritium-Tritium fusion has reaction probabilities approximately two orders of magnitude lower than the D-T reaction. Thus, all parameters of respective neutron generator tubes (NGTs) being equal, the neutron yield of a neutron generator based on the T-T reaction is expected to be about two orders of magnitude lower than a generator based on the D-T fusion reaction. Such a reduction in neutron output would reduce the count rate on detecting instrumentation, causing a corresponding increase in counting statistics. An increase in the counting time interval (or an equivalent reduction in logging speed for well logging applications), to overcome this increase in counting statistics is not practically feasible. A two orders of magnitude decrease in logging speed, for example, to compensate for count rate reduction due to the T-T lower cross section, the device would have no practical use in typical well logging operations.

As discussed previously, conventional Penning-type neutron generator tubes for the oil/gas well logging industry suffer from physical limitations posed by the well or borehole environment. Neutron generator targets of conventional design typically consist of a copper rod of less than half inch in diameter, with an end face of the copper rod serving as an axially facing circular target surface area. The relatively small target surface area of conventional NGs determines the thickness of a Titanium target layer deposited in the cross sectional area of the target rod. Because of the large difference in thermal conductivity of Titanium κ=21.9 W/mK° relative to the thermal conductivity of Copper κ=401 W/mK°, the thicker the Titanium layer deposited on the target face, the higher the temperature increase due to ion bombardment during the tube's operation. The Titanium layer on the target rod can therefore reach temperatures in excess of 250° C., at which point Titanium starts desorbing the implanted target particles in the target area substantially lowering the neutron yield. Thermal behavior of the target layer therefore limits neutron yield and prevents attainment of the higher neutron yields for feasible use of the T-T fusion reaction in well logging applications, as explained above.

The provision of a cylindrical target in the example form of the target layers 137 on the co-axial target rod 127 increases the relevant target surface by more than an order of magnitude, when compared to the conventional axially layout. This allows reduction in the thickness of the titanium, erbium, and other transition metals layers deposited on the target rod 127. In this example, the target layers 137 are about 5000 to about 15000 Ångströms in total thickness. Reduction in target layer thickness results in improved heat transfer to the copper rod 127, reducing Deuterium desorption at elevated temperatures.

Neutron yield of conventional neutron generator tubes based on the D-T fusion reaction is in the order of 1e8 neutron per second. This neutron yield is, as explained above, limited mainly by: a) ion extraction efficiency, b) ion beam coverage of target surface area, c) power dissipation of the target rod and d) thermal desorption of D/T at the Ti layer. It is a benefit of the arrangement of the neutron generator 100 described above that, using the FI array 141 to directly ionize the tritium gas, to produce T+ ions are at least 50% monatomic T+ ions. This larger percentage of monatomic ions increases the output n-yield of the NG by similar amount. Moreover, the cylindrical surface of the target rod 127 is an order of magnitude greater than for an axial NGT. In addition, reduced thickness of the target layers 137, lodging reduces thermal desorption of the target, as discussed. For these reasons, it has been found that the neutron generator 100 has a neutron production yield of the order of 1e7 neutron per second from the T-T fusion reaction, sufficient for use in well logging applications.

FIG. 6 illustrates an example of a wireline logging system 600 that may incorporate a neutron generator 100 such as that described above with reference to the example embodiments of FIGS. 1-2. The neutron generator 100 may be incorporated in a tool 605 that is configured for subsurface deployment by insertion and movement along a borehole 616.

The system 600 includes a derrick 610 that supports a pulley 615. Drilling of oil and gas wells is commonly carried out by a string of drill pipes connected together so as to form a drilling string that is loaded through a rotary table 620 into a wellbore or borehole 616. FIG. 6 shows the borehole 616 with the drilling string temporarily removed to allow the wireline logging tool 605, for example being in the form of a probe or a sonde, to be lowered by wireline or logging cable 625 into the borehole 616.

The wireline logging cable 625 may have one or more electrical and/or optical conductors for communicating power and signals between the surface and the logging tool 605. Typically, the tool 605 is lowered to the bottom of the region of interest and subsequently pulled upward. During the upward trip, measurement instrumentation 606 located in the tool 605 may be used to perform measurements on subsurface formations 635 adjacent a borehole 616 as they pass by.

The measurement instrumentation 606 may include detectors and/or sensors configured to investigate downhole pressure, downhole temperature, resistivity or conductivity of drilling mud and the Earth formations 635, the density and porosity of the Earth formations 635, as well as the orientation of the borehole 616. Sensor examples include, but are not limited to: a resistivity sensor, a porosity sensor, a nuclear density sensor, a magnetic resonance sensor, and a directional sensor package. In addition, formation fluid samples and/or core samples may be extracted from the formation 635 using a formation tester. Such sensors and tools are known to those skilled in the art. While described herein as a wireline logging operation, it will be understood by those skilled in the art that similar measurements may be made during drilling, completion, and production operations. Such sensors may be deployed using coiled tubing, drill pipe, and pre-wired drill pipe.

In this example embodiment, the tool 605 has incorporated therein a neutron generator 100 such as that described above with reference to FIGS. 1-2. A method for well logging according to an example embodiment may thus comprise causing neutron generation and emission from the tool 605 based predominantly, substantially exclusively, on the tritium-tritium fusion reaction. At least some components of the sensor instrumentation of the tool 605 is configured specifically to detect and measure parameters indicating formation characteristics based on the T-T neutron emission. Such parameters may include measurement data captured by the tool 605 based on inelastic scattering of the emitted neutrons within the formation 635.

The measurement instrumentation 606 of the tool 605 configured for cooperation with the T-T neutron generator 100 include measurement instrumentation 606 conventionally used in cooperation with AmBe241 chemical neutron generators. In this example embodiment, the measurement instrumentation 606 includes a porosity sensor for capturing measurement parameters indicative of formation porosity, based on neutron emission from the T-T neutron generator 100. This embodiment also includes determining hydrogen index characteristics for the formations 635 based on the T-T based neutron emission from the neutron generator 100.

The measurement data can be communicated to a surface processor 641 in a logging facility 646 for storage, processing, and analysis. The logging facility 646 may be provided with electronic equipment for various types of signal processing Similar log data may be gathered and analyzed during drilling operations (e.g., during logging while drilling, or LWD operations). The log data may also be displayed at the rig site for use in the drilling and/or completion operation on a display device 661.

Well logging methods according using the T-T fusion reaction may thus include processing measurement data captured downhole by the example tool 605 to determine or evaluate various formation characteristics. As discussed above, these formation characteristics which are specifically investigated using neutron emissions from the T-T fusion reaction include formation porosity and hydrogen index.

One aspect of the disclosure realized by the above describe example embodiments includes a well tool comprising a neutron generator configured to generate and emit energetic neutrons using substantially exclusively a tritium-tritium fusion reaction. The neutron generator may comprise:

a housing incorporated in the well tool and defining a ion chamber;

a target structure located in the ion chamber and holding target particles for the fusion reaction, the target particles consisting substantially exclusively of tritium particles;

an ion source configured to provide items for the fusion reaction, the ions consisting substantially exclusively of tritium ions; and an accelerator arrangement configured for accelerating the mobile ions into impact with the target structure, to cause the tritium-tritium fusion reaction by collision of the accelerated ions and the target particles.

The target structure may comprise a cylindrical target rod located on a central longitudinal axis of the housing, the accelerator arrangement being configured to accelerate the mobile ions radially inwards into contact with the target rod. The target structure may further comprise one or more target layers deposited on a radially outer surface of the target rod, the one or more target layers being loaded with target particles, for example being loaded with tritium atoms. The ion source may comprise a gas source configured to deliver tritium gas to the ion chamber, and a field ionization array disposed in the ion chamber and configured to cause ionization of the tritium gas through field ionization.

The housing may provide an inner cylindrical surface co-axial with the target rod, the field ionization array comprising an array of nanotips located on the inner cylindrical surface and directed radially inwards towards the target rod. In some embodiments, the array of nanotips may comprise carbon nanofibers. Instead, or in addition, the array of nanotips may comprise tungsten nanotips.

The well tool may further comprise measuring instrumentation configured for measurement and logging of formation parameters based on elastic scattering in subsurface formations of neutrons emitted by the neutron generator. The neutron generator may be configured to generate and emit neutrons with an average energy of about 4 MeV.

Another aspect of the disclosure realized by the described example embodiments include a method comprising: causing neutron emission from a logging tool in a borehole, the neutron emission produced substantially exclusively by a tritium-tritium fusion reaction; and capturing at the logging tool measurement data indicative of formation characteristics based on the neutron emission.

The method may further comprise processing the captured logging tool measurement data to determine formation porosity characteristics. In some embodiments, the method may comprise processing the captured logging tool measurement data to determine a formation hydrogen index.

Causing the neutron emission may comprise: (a) loading a target structure with target particles consisting substantially exclusively of tritium particles, the target structure being located in an ion chamber of a neutron generator incorporated in the logging tool, (b) producing mobile ions in the ion chamber, the mobile ions being substantially exclusively tritium ions, and (c) accelerating the mobile ions into impact with the target structure, to cause the tritium-tritium fusion reaction by collision of the accelerated ions and the target particles.

Producing the mobile ions may comprise delivering tritium gas to the ion chamber, and causing ionization of the tritium gas by field ionization. Causing the ionization of the tritium gas may comprise energizing a nanotip field ionization array located in the ion chamber. In some embodiments, the nanotip field ionization array may be located on a radially inner cylindrical substrate co-axial with a longitudinal axis of the logging tool, the target structure comprising a cylindrical target rod co-axial with the field ionization array, and wherein the accelerating of the mobile ions comprises accelerating the mobile ions radially inwardly into impact with the target structure.

Yet a further aspect of the disclosure realized by the described example embodiments include a logging system for evaluating subsurface formation characteristics based on downhole neutron emission using substantially exclusively a tritium-tritium fusion reaction.

Although systems, apparatuses, and methods according to the disclosure a have been described with reference to specific example embodiments, it will be evident that various modifications and changes may be made to these embodiments without departing from the broader scope of methods, apparatuses, and/or systems. Accordingly, the specification and drawings are to be regarded in an illustrative rather than a restrictive sense.

In the foregoing Detailed Description, it can be seen that various features are grouped together in a single embodiment for the purpose of streamlining the disclosure. This method of disclosure is not to be interpreted as reflecting an intention that the claimed embodiments in all instances have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A well tool comprising:
a housing defining an ion chamber;
a target structure, located in the ion chamber and coaxial with the ion chamber, holding target particles for a fusion reaction, the target particles comprising in majority of tritium particles; and
a field ionization array disposed on an inner cylindrical surface of the housing to cause ionization of tritium gas through field ionization, wherein the field ionization array comprises an array of nanotips that are directed radially inwards towards the target structure.

2. The well tool of claim 1, further comprising an ion source to provide ions for the fusion reaction, the ions comprising in majority of tritium ions.

3. The well tool of claim 2, wherein the target structure comprises a cylindrical target rod located on a central longitudinal axis of the housing.

4. The well tool of claim 3, wherein the target structure further comprises one or more target layers deposited on a radially outer surface of the cylindrical target rod, the one or more target layers being loaded with the target particles.

5. The well tool of claim 2, wherein the ion source comprises a gas source to deliver tritium gas to the ion chamber.

6. The well tool of claim 1, wherein the array of nanotips comprises carbon nanofibers.

7. The well tool of claim 1, wherein the array of nanotips comprises tungsten nanotips.

8. The well tool of claim 1, further comprising measuring instrumentation for measurement and logging of formation parameters based on elastic scattering in subsurface formations of neutrons emitted by the well tool.

9. The well tool of claim 1, further comprising instrumentation for neutron porosity logging based on neutron emission by the well tool.

10. A method comprising:
   energizing a nanotip field ionization array located in an ion chamber to cause ionization of tritium gas by field ionization;
   accelerating mobile ions radially inward from the nanotip field ionization array into impact with a target structure to cause a tritium-tritium fusion reaction by collision of the ions emitted by the nanotip field ionization array and target particles; and
   capturing logging tool measurement data indicative of formation characteristics based on neutron emissions generated by tritium-tritium fusion reactions.

11. The method of claim 10, further comprising processing the captured logging tool measurement data to determine formation porosity characteristics.

12. The method of claim 10, further comprising processing the captured logging tool measurement data to determine a formation hydrogen index.

13. The method of claim 10, further comprising delivering tritium gas to the ion chamber.

14. The method of claim 10, further comprising maintaining the temperature of the target structure below a threshold, wherein thermal desorption of the target particles occurs above the threshold.

15. The well tool of claim 1, wherein the target structure further comprises one or more target layers deposited on a surface of the target structure, the one or more target layers being loaded with the target particles, and the one or more target layers have a thickness less than or equal to 15000 Ångströms.

16. A well tool comprising:
   a housing defining an ion chamber;
   a target structure, located in the ion chamber and coaxial with the ion chamber, holding target particles for a fusion reaction, the target particles comprising in majority of tritium particles, wherein the target structure comprises one or more target layers deposited on a surface of the target structure, the one or more target layers being loaded with the target particles and the one or more target layers have a thickness less than or equal to 15000 Ångströms; and
   a field ionization array disposed on an inner surface of the housing to cause ionization of tritium gas through field ionization.

17. The well tool of claim 16, wherein the target structure further comprises a material underneath one or more target layers with a thermal conductivity equal to or greater than copper.

18. The well tool of claim 16, wherein the field ionization array comprises tungsten nanotips.

19. The well tool of claim 16, wherein the thickness of the one or more target layers are greater than or equal to 5000 Ångströms.

* * * * *